April 4, 1967    F. A. FASSBENDER    3,312,228
TOBACCO PIPES HAVING SMOKE-FILTERING MEANS
Filed March 3, 1965
FIG.1.
FIG.2.
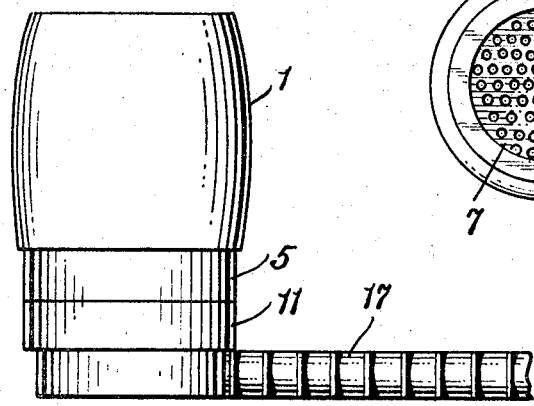
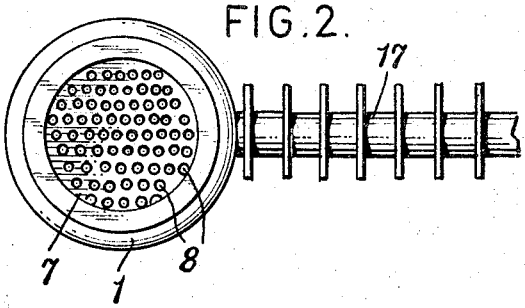
FIG.3.
FIG.4.
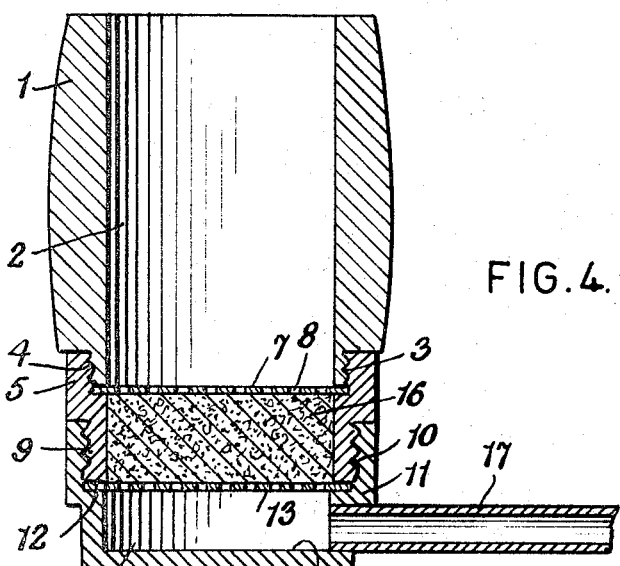
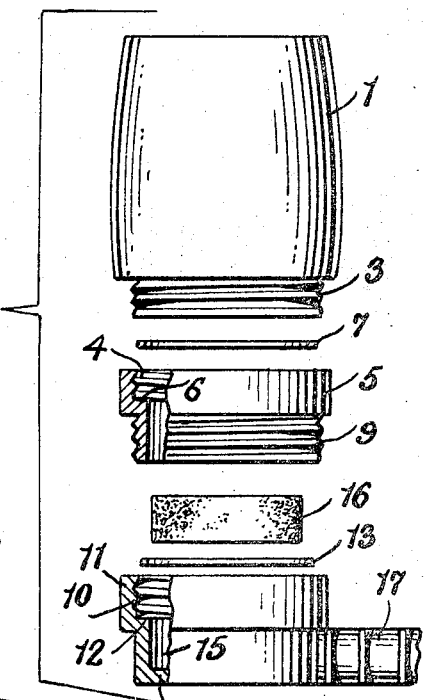
FIG.5.
FIG.6.
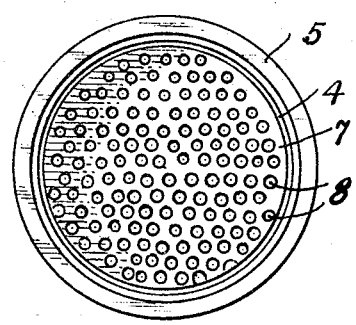
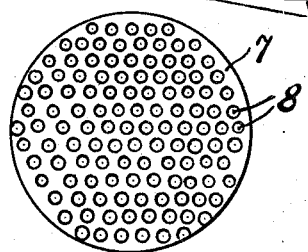
INVENTOR.
Frederick A. Fassbender
BY
Attorney

United States Patent Office 3,312,228
Patented Apr. 4, 1967

3,312,228
TOBACCO PIPES HAVING SMOKE-FILTERING MEANS
Frederick A. Fassbender, West Orange, N.J., assignor to S. M. Frank & Co., Inc., New York, N.Y., a corporation of New York
Filed Mar. 3, 1965, Ser. No. 436,841
9 Claims. (Cl. 131—205)

This invention relates to tobacco pipes, and has for one of its objects the provision of a pipe provided with smoke-filtering means which is effective in operation and which permits the pipe to be readily dismantled for cleaning and for the replacement of its filter.

It is another object of the invention to provide a pipe in which charcoal or other suitable filtration means can be employed and which will be of such construction that the pipe can be used with or without the filter.

It is another object of the invention to provide a filtering unit which can be readily applied to a known type of pipe, thereby increasing the usefulness and advantages of such type of pipe.

It is another object of the invention to provide a filter unit for use in a tobacco pipe and more particularly in a pipe having a bowl composed of a plurality of separate parts namely, an upper bowl section and a cup-shaped lower section, and which bowl parts are usually threadably joined together to form a complete two-part bowl. The improved filter unit is one which is capable of application to such a pipe by its disposition between the upper and lower bowl parts and to which parts it is threadably coupled. The filter unit, which consists of a ring containing a disk or cylindrical block of filter material such as charcoal, as well as a foraminous metal disk located above the charcoal disk, and also a similar disk located below the charcoal, is thus a complete, self-contained filter unit that can be made and sold independently of a pipe having the construction above described. Such filter unit can thus be readily fitted to such a pipe by the pipe user to thereby provide the usefulness and facility of an effective and satisfactory filter unit.

More particularly, the invention contemplates the provision of a pipe having a bowl consisting of three threadably-connected sections, one of said sections consisting of a ring containing a foraminous disk, said ring acting to confine a second similar foraminous disk between it and a cupped bottom element of the bowl. The two disks, in spaced-apart relation, define a filter chamber between them in the ring, and said chamber contains a removable and replaceable block or disk composed of charcoal particles or other approved filtering material. The ring above described and the foraminous disks associated with it constitute the filtering unit hertofore mentioned.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a side elevational view of the bowl and a part of the stem of a tobacco pipe as constructed according to the invention;

FIG. 2 is a top plan view of the same;

FIG. 3 is an enlarged vertical sectional view of the part of the pipe disclosed in FIGS. 1 and 2;

FIG. 4 is an exploded view of the pipe, with some of the parts thereof being partially shown in section;

FIG. 5 is a top plan view of the filter-retaining ring, with the uppermost foraminous disk in place therein, and FIG. 6 is a face view of one of the foraminous disks.

The bowl of the pipe is composed of three threadably-united elements, one of which is the upper bowl section shown at the top of FIG. 4 and indicated at 1, the same being composed of wood or any other suitable material of which tobacco pipes are usually made. The bowl section 1 is provided with the usual central passage constituting the tobacco-receiving well 2.

At its lower end, the bowl section 1 is formed with screw-threads 3, adapted for threadable reception in the threads 4 provided in the interior of a metallic filter-receiving ring 5 and in the upper portion of said ring, said ring constituting the intermediate part of the pipe bowl. Below the threads 4 on the inside of the ring 5 is formed an annular horizontal ledge 6 serving as a seat for a metal disk 7 which is provided throughout its area with perforations 8, so that it is foraminous. When the foraminous disk 7 rests on the annular ledge 6 and the bowl section 1 is threaded into the ring 5 by the engagement of the threads 3 and 4, the lower end of the threaded part 3 of the bowl section 1 will clampingly press the disk 7 down on the ledge 6 to thus hold the disk 7 in place and enable it to serve as a grate for the tobacco placed within the pipe bowl.

In its lower portion, the filter-retaining ring 5 is formed with threads 9 for the threadable engagement with complementary threads 10 provided in the interior of a cup-member 11 constituting the third and lower portion of the pipe bowl. The interior of the cup member 11 is formed below its threads 10 with a ledge 12 on which a metallic foraminous disk 13, similar to the disk 7, is seated. As above stated, the ledge 12 is located below the threads 10 and is situated above the bottom 14 of the cup member 11, so that a well 15 exists in the cup between the foraminous disk 13 and the bottom of the cup.

When the ring 5 is threadably fitted into the cup 11 as above described, the lower end of the threaded part 9 of the ring will serve to clampingly hold the foraminous disk 13 down upon the seat formed by the ledge 12.

By means of the arrangement described it will be noted that the two foraminous disk 7 and 13 are held in spaced relation within the bowl that is constituted by the three threadably-connected elements 1, 5 and 11. There is thus a space or chamber formed between the disks 7 and 13 and in the embodiment disclosed, this space is occupied by filtering material, which may consist of a disk or block composed of charcoal particles bonded together by a suitable binder. The charcoal or other disk 16 is thus held in place between the disks 7 and 13 by its confinement between said disks.

Projecting from the cup 11 is the stem 17 which communicates at one end with the interior of the cup 11 and into the well 15 thereof as clearly shown in FIG. 3. The stem may be of the finned type shown or can be of any other desired formation.

The described arrangement is such that the dismantling of the pipe bowl for cleaning or for changing and replacement of the filter 16 or one or both of the disks 7 or 13 is easily performed. By unthreading the bowl section 1, the upper disk 7 is rendered accessible and by inverting the pipe the disk will readily drop out. By removal of the ring 5 from its joinder to the cup 11, the lower disk 13 is easily removed and the charcoal filter 16 can also be readily pushed out of the ring 5 and a new one inserted therein. Upon the insertion of a new charcoal filter, the parts of the bowl are threadably united in the relationship clearly disclosed in FIGS. 1, 2 and 3.

The structure thus disclosed is such that the pipe can be readily cleaned and the filter replaced when required to provide for a maximum of filtration. If at any time a charcoal replacement filter 16 is not available, the user of the pipe need not be deprived of the pleasure of a smoke, for by the removal of the ring 5 and the clogged or coated filter then held by it, the bowl section 1 may then be directly threaded into the cup 11 over the top of the disk 13 and the pipe may then be smoked, with the tobacco therein being supported directly on the lower disk 13.

Having thus described a single embodiment of the invention, it is obvious that the same is not to be restricted thereto, but is broad enough to cover all structures coming within the scope of the annexed claims.

What I claim is:

1. A pipe having an upper bowl portion, a cup closing the lower end of the bowl portion, a stem projecting from the cup, a ring interposed between the lower end of the bowl portion and the top of the cup, a foraminous disk located within the ring near the upper end of the same, a second foraminous disk located below the lower end of the ring and a filter located in the ring between the foraminous disks, the second foraminous disk being retained between the lower end of the ring and a part of the interior of the cup, and the two disks defining a chamber between them and the ring, the filter being composed of charcoal and being located in said chamber between said disks.

2. A pipe having an upper bowl portion, a ring threadably fitted on the lower end of the bowl portion, a foraminous disk fitted between the lower end of the bowl portion and an internal part of the ring, the ring having a threaded lower end, a cup threadably receiving said threaded lower end of the ring, a foraminous disk located in the cup between the lower threaded end of the ring and a part of the cup located below the threaded lower part of the ring, the cup having a projecting stem, and a charcoal filter contained within the ring and situated between the foraminous disks.

3. A pipe having an upper bowl portion provided with a threaded lower end, an internally threaded ring engaged with the threaded lower end of the bowl portion, said ring having an internal annular ledge, a foraminous disk contained within the ring and seated on said ledge, said disk being confined between said ledge and the lower end of the threaded part of the bowl portion, the ring having a threaded lower portion, a cup having a projecting stem, said cup being internally threaded to receive the threaded lower portion of the ring, the cup having an internal annular ledge, a foraminous disk seated on the last-mentioned ledge and confined between said ledge and the lower end of the threaded lower part of the ring, the two foraminous disks defining a cylindrical chamber between them, said chamber containing a removable disk of filtration material disposed between the disks.

4. A pipe according to claim 3, wherein the bowl of the pipe is composed of the upper bowl portion, the ring and the cup, with these elements being threadably united; with the filter material being wholly confined within the ring and removable with the ring when the ring is separated from the upper bowl portion and the cup, and with the disks being removable from the bowl by said removal of the ring from the upper bowl portion and the cup.

5. A pipe having a bowl composed of an upper section, a bottom cup and a ring disposed between the upper bowl section and the said cup, said ring being threadably coupled to the upper bowl section and to the cup, the ring confining a first perforated disk between it and the lower end of the upper bowl section, the cup having an internal ledge, the ring confining a second perforated disk between its lower end and the ledge, and a block of filtration material confined in the ring between the perforated disks.

6. A pipe having an upper bowl section provided with a threaded lower end, a cup constituting a bottom for the bowl and being provided with threads complementary to those on the upper bowl section, a ring having threads engaging the threads on the bowl section and having other threads engaging the threads in the cup, the ring confining perforated disks respectively between it and the upper bowl section and between it and the cup, and filtration material disposed in the ring between the disks.

7. A pipe having an upper bowl portion provided with a threaded lower end, an internally threaded ring threadably engaged with the threads on the lower end of the bowl portion, the ring being formed with an annular ledge located below its internal threads, a foraminous disk seated on the ledge and clamped between the lower end of the bowl portion and said ledge, the ring having external threads in its lower portion, a cup having a projecting stem and provided with internal threads, the cup having an annular ledge formed in its interior below the internal threads, a foraminous disk seated on the last-mentioned ledge, said disk being confined and clampingly held between the said last-mentioned ledge and the lower end of the ring, and a block of filtration material disposed within the ring and confined therein between the two foraminous disks.

8. A pipe having a bowl composed of an upper bowl section and a cupped bottom section and an intervening ring disposed between the upper and lower sections, the sections and the ring being threadably joined together, the ring containing filtration material, foraminous disks between which the filtration material is located, one of said disks being located between a part of the ring and the upper bowl section and the other disk being located between the ring and the cupped bottom section.

9. A filter unit for tobacco pipes comprising a ring having an internal ledge on which a perforated disk is seated, the upper portion of the ring above the ledge being internally threaded for the reception of the lower end of an upper pipe bowl section, the lower end of the ring being externally threaded for fitment within the top of a lower pipe bowl section, and a perforated disk for positioning below the bottom of the ring, and a disk of filter material located within the ring between the disks.

References Cited by the Examiner

UNITED STATES PATENTS

| 40,881 | 12/1863 | Fickey | 131—214 X |
| 1,290,791 | 1/1919 | Sebenste | 131—214 |
| 1,434,261 | 10/1922 | Nagle | 131—206 |
| 1,762,636 | 6/1930 | Markstein | 131—205 |
| 2,373,296 | 4/1945 | Donnelly | 131—205 |

FOREIGN PATENTS

| 3,787 | 3/1889 | Great Britain. |
| 632 | 1/1904 | Great Britain. |

ALDRICH F. MEDBERY, *Acting Primary Examiner.*

JOSEPH S. REICH, SAMUEL KOREN, *Examiners.*